United States Patent [19]

Fitzgerald et al.

[11] Patent Number: 4,898,898
[45] Date of Patent: Feb. 6, 1990

[54] POLYMER-DENSIFIED FILLERS

[75] Inventors: Thomas H. Fitzgerald, Guilderland; John S. Razzano, Cohoes; Todd R. Stegman, Troy, all of N.Y.

[73] Assignee: General Electric Company, Waterford, N.Y.

[21] Appl. No.: 355,106

[22] Filed: May 19, 1989

Related U.S. Application Data

[63] Continuation of Ser. No. 915,939, Oct. 6, 1986, abandoned, which is a continuation of Ser. No. 539,587, Oct. 6, 1983, abandoned.

[51] Int. Cl.$^4$ .............................. C08K 3/34; C08J 3/20
[52] U.S. Cl. ..................................... 523/351; 524/588
[58] Field of Search ......................... 523/351; 524/588

[56] References Cited

U.S. PATENT DOCUMENTS

| | | | |
|---|---|---|---|
| 3,261,802 | 7/1966 | Bobear | 523/351 |
| 3,824,208 | 7/1974 | Link et al. | 524/588 |
| 3,960,804 | 6/1976 | Minuto | 524/588 |

Primary Examiner—Lewis T. Jacobs
Attorney, Agent, or Firm—G. L. Loser

[57] ABSTRACT

A method for providing polymer-densified fillers consisting essentially of mixing 100 parts of a silicone polymer with 50 to 500 parts of reinforcing filler or 400 to 5000 parts of extending filler and mixing such blend for an amount of time effective for providing a dense, free-flowing particulate mixture.

25 Claims, No Drawings

POLYMER-DENSIFIED FILLERS

This application is a continuation of application Ser. No. 915,939, filed Oct. 6, 1986, now abandoned, which is a continuation of application Ser. No. 539,587, filed Oct. 6, 1983, now abandoned.

BACKGROUND OF THE INVENTION

The present invention relates to a method for densifying or compacting fillers and to the compositions made by such method. More particularly, the present invention relates to a method for densifying reinforcing fillers such as fumed silica and precipitated silica or extending fillers such as ground quartz and calcium carbonate by blending such filler with a silicone polymer to provide free-flowing powders having higher densities than can be obtained using present densification methods.

Reinforcing fillers such as fumed silica and precipitated silica are well known in the prior art. Basically, these fillers are silicon dioxide particles in extremely finely divided form, that is, they have a particle size of less than 1 micron, preferably less than 500 millimicrons and most preferably less than 100 millimicrons. The specific surface area of the substances therefore correspondingly is between several square meters per gram and several hundred square meters per gram, for example, between 10 and 400 square meters per gram. Similarly, the density correspondingly ranges from about 3 to about 5 pounds per cubic foot. Generally such reinforcing fillers are added to a silicone composition in order to provide high tensile strength and hardness.

One method for the production of extremely finely divided silica is the pyrogenic hydrolysis of volatile silicon halides, preferably chlorosilanes, to produce oxides in the gas phase according to the reaction equation (for silicone tetrachloride):

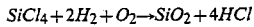

$$SiCl_4 + 2H_2 + O_2 \rightarrow SiO_2 + 4HCl$$

Such methods of pyrogenic hydrolysis are well known in the art, for example, U.S. Pat. No. 3,954,945, U.K. Pat. No. 1,121,278 and U.K. Pat. No. 1,121,279.

Another known method for the production of extremely finely divided silicon dioxide particles is the precipitation of silica from alkali metal silicate solutions with acids such as, for example, carbonic acid or sulfuric acid. The gel thus obtained is filtered off, washed and dried and, if necessary, ground so as to provide a precipitated silica filler having a surface area between about ten and several hundred square meters per gram.

It is furthermore known that mixtures of oxidic substances and carbon can be given a reducing treatment in an electric arc furnace in such a manner that a gas mixture of carbon monoxide and metal oxide is obtained and which is then burned, taking care that the combustion is complete and that the temperature is sufficiently low that agglomeration is avoided. Such a process is described, for example, in U.S. Pat. No. 2,862,792 and U.S. Pat. No. 3,311,451.

Those skilled in the art are familiar with the foregoing methods of manufacturing reinforcing fillers as well as other suitable methods.

Extending fillers, for example, ground quartz, diatomaceous earth, zinc oxide, titanium dioxide, calcium carbonate, iron oxides and the like are also well known in the art. Extending fillers are typically included in a composition not only to lower costs, but also to increase durometer and to reduce elongation.

While reinforcing fillers are usually critical in formulating silicone compositions suitable for a particular purpose, such fillers suffer from the disadvantage that due to their low density they are rather expensive to ship and store. A compounder or formulator who requires large quantities of fillers must pay premium rates for shipping, for example, by rail car, because a rail car cannot contain large amounts, on a weight basis, of such fillers. Moreover, once the compounder receives the fillers he must pay for a suitable storage area such as a warehouse, silo or the like, which further adds to the costs which are ultimately passed on to the final customers or end-users.

Accordingly it would be highly desirable to provide a means for increasing the density of fillers in order to reduce transportation and shipping costs. Furthermore, it would also be highly desirable to provide a densified reinforcing or extending filler which is easily and quickly mixed into other silicone polymers so as to increase efficiency and productivity.

An apparatus for densifying and granulating powdered materials is disclosed in Oldham et al., U.S. Pat. No. 3,114,930. Oldham et al. relies on the use of a vacuum to remove air from an aerated powdered material thereby reducing the density.

Loffler in U.S. Pat. No. 3,632,247 expands upon the invention of Oldham et al. in that powders are compressed and deaerated between vacuum cylinders which are arranged in groups requiring different vacuum and connected to a common vacuum line. Valve control means in the vacuum line automatically and continuously adjust the vacuum pressure for the groups of cylinders.

Carter, U.S. Pat. No. 3,664,385, compacts finely divided particulate material by utilizing a rotating screw feeder. The particulate material is advanced axially along a sleeve with the interstitial air between the particles in the sleeve at an internal sleeve pressure. Suction pressure relatively lower than the internal sleeve pressure is applied to the exterior of the sleeve to withdraw air from between the particles of the material to effect compaction.

U.S. Pat. No. 4,126,423 to Kongsgaarden discloses a method for compacting silica dust wherein the dust is charged to a drum having closed ends and is tumbled therein. Kongsgaarden, in U.S. Pat. No. 4,126,424, provides an alternate method for compacting silica dust which comprises charging the dust to a hopper and thereafter injecting pressurized air into the hopper. The air is of sufficient force to fluidize the silica dust in the hopper and maintain it in an agitated state. When the treatment with air has been completed, the bulk density of the material has increased by up to 300%.

Leon et al., in U.S. Pat. No. 4,325,686, disclosed a powder densifying apparatus comprising a pair of opposed gas-permeable belts arranged to either side of a common axis so as to define a generally convergent densifying zone between their adjacent faces. The gas-permeable belts are driven toward the convergent end of the densifying zone at substantially equal speeds while powder material to be densified is fed into the divergent end of the densifying zone at a rate sufficient to maintain a substantially complete fill thereof.

Kratel et al., U.S. Pat. No. 4,326,852, provides a method for increasing the bulk weight of silicon dioxide with a surface of at least 50 square meters per gram by means of sub-atmospheric pressure applied at a filter face, wherein the silicon dioxide is moved by means of a conveyor screw, whose longitudinal axis is arranged parallel with respect to the filter face and which preferably has a decreasing thread pitch in the feeding direction.

While fillers prepared in accordance with the foregoing patents are substantially more dense than without including a densification step, it is nevertheless difficult, time consuming and rather costly to incorporate such fillers into a viscous, tacky silicone polymer. Moreover, the density is still not such that substantial savings in shipping and storage can be attained.

Accordingly, it is highly desirable to provide a means for providing even more dense reinforcing and extending fillers. Furthermore, it is desirable to provide such dense fillers which are also easily and quickly mixed with other silicone polymer.

SUMMARY OF THE INVENTION

It is one object of the present invention to provide a method for densifying reinforcing fillers and extending fillers by blending such fillers with a silicone polymer or mixture of silicone polymers.

Another object of the present invention is to provide a process for producing a free-flowing mixture of silicone polymer and filler which is easily and quickly blended into silicone compositions which are to be further processed to form silicone rubber or silicone elastomers.

In accordance with the present invention there is provided a process for producing polymer-densified fillers consisting essentially of:
(A) adding to a suitable mixing vessel:
  (i) 100 parts by weight of silicone polymer or mixture of silicone polymers having a viscosity ranging from about 1000 to about 200,000,000 centipoise at 25° C.; and
  (ii) an amount of filler selected from:
    (a) 50 to 500 parts by weight of reinforcing filler per 100 parts by weight of said silicone polymer;
    (b) 400 to 5000 parts by weight of extending filler per 100 parts by weight of said silicone polymer; and
    (c) mixtures of (a) and (b); and
(B) mixing said silicone polymer and said filler for an amount of time effective for providing a free-flowing densified particulate mixture.

It should be noted that Link and Scarbel, U.S. Pat. No. 3,824,208, provide a similar method to solve a nonanalagous problem, that is, in order to form a free-flowing particulate polymer from a viscous, tacky polymer, Link and Scarbel also mixed filler and polymer. In its broadest aspect, Link and Scarbel disclose a process for producing a free-flowing particulate mixture from a viscous, tacky and cohesive polymer by (a) reducing the polymer to particles of a size ranging from 0.1 microns to 25.4 millimeters, (b) mixing the particles of polymer with at least 15 parts of filler, preferably 20 to 900 parts filler, per 100 parts polymer, and (c) recovering the resultant free-flowing mixture. The reference further teaches that steps (a) and (b) can be carried out simultaneously.

It was the object of Link and Scarbel to provide a method for producing a free-flowing particulate mixture from a viscous, tacky polymer in order to provide a continuous process for making heat curable rubber. In addition to the diorganopolysiloxane and filler, Link and Scarbel contemplated the inclusion of process aids, bonding additives, heat stabilizer additives, catalysts flame retardant additives and the like. According to the disclosure of Link and Scarbel, the resulting free-flowing mixture could be massed to form a heat curable or room temperature vulcanizable composition.

Link and Scarbel teach that the polymer and filler should be mixed only for a time which is effective to render the polymer and filler mixture free-flowing. The density of the mixture is unimportant except as it relates to equipment selection. Obtaining a polymer-densified filler by mixing in excess of the time taught by Link and Scarbel is neither disclosed nor suggested. In fact, Link and Scarbel teach that mixing in excess of the time required to obtain a uniform, free-flowing mixture is undesirable as heat generated by such mixing may cause the mixture to mass.

In direct contrast to the foregoing teachings of Link and Scarbel, the present applicants have surprisingly found that mixing filler and polymer beyond the time required to form a free-flowing mixture results in a mixture having increased density rather than a mass of unprocessable polymer.

DESCRIPTION OF THE INVENTION

The present invention provides a process for producing polymer-densified reinforcing and extending fillers consisting essentially of:
(A) adding to a suitable mixing vessel:
  (i) 100 parts by weight of a silicone polymer or mixture of silicone polymers having a viscosity ranging from about 1000 to about 200,000,000 centipoise at 25° C.; and
  (ii) an amount of filler selected from:
    (a) 50 to 500 parts by weight of reinforcing filler per 100 parts by weight of said silicone polymer;
    (b) 400 to 5000 parts by weight of extending filler per 100 parts by weight of said silicone polymer; and
    (c) mixtures of (a) and (b); and
(B) mixing said silicone polymer and said filler for an amount of time effective for providing a free-flowing densified particulate mixture.

In general, the silicone polymer is an organopolysiloxane having a viscosity ranging from about 1000 to about 200,000,000 centipoise at 25° C. Such polymers are of the general formula

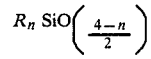

$$R_n \text{SiO}\left(\frac{4-n}{2}\right)$$

where R is selected from the group consisting of monovalent hydrocarbon radicals, halogenated monovalent hydrocarbon radicals and cyanoalkyl radicals and n varies from 1.95 to 2.1 inclusive. More preferably, the viscosity of the silicone polymer ranges from 100,000 to 50,000,000 centipoise at 25° C. and most preferably the viscosity ranges from 1,000,000 to 40,000,000 centipoise at 25° C.

Included among the suitable R radicals are alkyl radicals such as methyl, ethyl, propyl and butyl; aryl radicals such as phenyl, tolyl and xylyl; aralkyl radicals such as benzyl and phenylethyl; cycloalkyl and cycloalkenyl radicals such as cylohexyl, cycloheptyl, cyclopentenyl and cyclohexenyl; alkenyl radicals such as vinyl, allyl and butenyl; alkaryl radicals; cyanoalkyl radicals; haloalkyl radicals; haloalkenyl radicals and haloaryl radicals. Preferably, the silicone polymer contains methyl groups, vinyl groups or mixtures thereof. Silicone polymers envisioned to be within the scope of the present invention are well known to those skilled in the art. However, the reader interested in a more detailed explanation is referred to Link and Scarbel, U.S. Pat. No. 3,824,208, which is incorporated herein by reference.

Also within the scope of polymers of the above formula are mixtures of polymers having the general formula

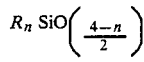

and copolymers containing two or more different diorganosiloxane units therein. Additionally, it is not critical as to whether such a copolymer is a block copolymer or a random copolymer. Examples of copolymers within the scope of the present invention are copolymers of dimethylsiloxane units and methylphenylsiloxane units; copolymers of methylphenylsiloxane units, diphenylsiloxane units, dimethylsiloxane units, and methylvinylsiloxane units; and copolymers of methylvinylsiloxane units, dimethylsiloxane units and diphenylsiloxane units. Copolymers of this type are also well known to those skilled in the art.

The reinforcing fillers of the present invention are well known in the art, for example, fumed silica, treated fumed silica, precipitated silica, treated precipitated silica, silica aerogel and treated silica aerogel. Preferably the reinforcing filler is selected from fumed silica and treated fumed silica and most preferably is untreated fumed silica. There fillers may be prepared by well known methods, for example, as disclosed in the above-mentioned patents. Additionally, the reinforcing fillers employed in the instant process can be treated as described in Lucas, U.S. Pat. No. 2,938,009, which involves treating the silica filler with a cyclic siloxane such as octamethylcyclotetrasiloxane so that a certain amount of diorganosiloxy groups will be appended, substituted or joined to the hydroxyl groups of the silica filler. Reinforcing fillers such as fumed silica or precipitated silica can also be treated with a silicon-nitrogen compound, for example, a silicon-amine compound, as disclosed in U.S. Pat. No. 3,024,126. Another method for providing treated silica fillers within the scope of the present invention involves treating the filler with a hydroxyl amine and a silazane compound in separate steps or treating the filler with a cycic siloxane and a silazane compound as described in U.S. Pat. No. 3,635,743. The disclosures of the foregoing patents are incorporated by reference into the present application. Of course, it is within the scope of the present invention to utilize mixtures of suitable reinforcing fillers or treated reinforcing fillers.

Generally in practicing the present invention reinforcing filler is mixed with silicone polymer in an amount ranging from about 50 to about 400 parts by weight of filler per 100 parts by weight of silicone polymer. More preferably there is added 100 parts to 250 parts by weight of filler per 100 parts of polysiloxane, and most preferably there is added 100 parts by weight reinforcing filler per 100 parts by weight silicone polymer.

The reinforcing silica fillers utilized in the present invention should have a surface area of at least 20 square meters per gram and preferably should be greater than 50 square meters per gram. The most preferred reinforcing fillers have surface areas of 100, 200, 300 or more square meters per gram.

The density of the free-flowing, polymer-densified reinforcing filler will- of course vary depending upon the ratio of filler to polymer, the filler and polymer employed, the blade speed, and the mixing time. For example, if the mixture is formed from one part fumed silica and one part polymer with a viscosity of 20,000,000 centipoise, the density of the free-flowing, polymer-densified reinforcing filler will be on the order of 25 to 30 pounds per cubic foot. On the other hand, when the mixture is made of 5 parts filler per part polymer, the density will be on the order of 6 to 8 pounds per cubic foot. Preferred free-flowing, polymer-densified reinforcing fillers within the scope of the present invention have densities and mixing times as set forth in Table I.

TABLE I

| Filler/Polymer Ratio | Mixing Time (min.) | Density (lb/ft$^3$) |
|---|---|---|
| 1:1 | 30 | 30 |
| 2:1 | 30 | 12 |
| 3:1 | 30 | 10 |
| 4:1 | 30 | 8 |
| 5:1 | 30 | 7 |

Generally the density of the free-flowing, polymer-densified reinforcing filler should be at least 10 percent higher than when the mixture first became free-flowing particles. More preferably, the density will increase by about 100 percent and most preferably it will increase on the order of 500 percent.

The mixing time required to effect such density increase will of course vary depending on the blade speed, type of mixer, the type and viscosity of the polymer, the polymer to filler ratio, and the desired density of the free-flowing composition. Typically, the mixing time will be at least 50 percent longer than the time required to initially form a free-flowing mixture. More typically, however, the mixing time will be about twice as long as is required to form a free-flowing mixture.

It should be noted that regardless of the filler to polymer ratio, all of the polymer-densified reinforcing fillers of the present invention have a very fine consistency, for example, somewhat similar to talc. Experience thus far has shown that a 1 to 1 ratio provides several advantages in that such a mixture appears to have optimum flow and, additionally, the mixture is easily and rapidly mixed with other silicone polymers. A further advantage of employing a 1 to 1 mixture of filler and polymer in preparing polymer-densified reinforcing filler of the present invention is that maximum weight of filler per unit volume is obtained, thus making the filler less expensive to transport and store. On the other hand, a ratio of about 2.5 parts reinforcing filler per part polymer occupies only about twice the volume of a 1 to 1 ratio mixture. Accordingly, it will be obvious to the artisan that the most advantageous ratio of reinforcing filler to silicone polymer depends upon the particular purpose of the end-user. If the end-user is interested primarily in obtaining reinforcing filler, a ratio of 3 parts filler per part silicone polymer is preferable. If, on the other hand, the end-user requires substantial amounts of both reinforcing filler and silicone polymer, a ratio of about 1 to 1 will be optimal.

Also included within the scope of the present invention are extending fillers such as titanium oxide, lithopone, zinc oxide, zirconium silicate, iron oxide, diatomaceous earth, calcium carbonate, glass fibers, magnesium oxide, chromic oxide, zirconium oxide, aluminum oxide, crushed quartz, calcined clay, asbestos, carbon, graphite, and cork. Because the extending fillers are physically different than reinforcing fillers, they must be incorporated at higher levels in order to obtain free-flowing, polymer-densified extending fillers. Generally the extending filler is mixed with the silicone polymer in an amount ranging from about four parts filler per part silicone polymer to about fifty parts filler per part silicone polymer, one a weight basis. In a more preferred embodiment the polymer-densified extending filler is prepared from a mixture ranging from nine parts filler per part polymer to thirty five parts filler per part polymer. In the most preferred embodiment, the ratio of extending filler to silicone polymer ranges from 10 to 1 to 20 to 1.

The extending fillers of the present invention, of which ground quartz such as Minusil R is most preferred, have a surface area of about 2 to 50 square meters per gram. Of course, this is subject to substantial variation due to the wide variety of materials which can be used as extending fillers.

As with the polymer-densified reinforcing fillers, the density of the polymer-densified extending fillers will vary depending upon the ratio of filler to polymer and the particular filler and polymer employed. With extending fillers the ratio of filler to polymer is generally slightly higher, as mentioned hereinabove, in order to obtain a suitably densified extending filler. Thus, for example, if the mixture is formed from eight parts filler per part polymer the density of the polymer-densified extending filler will be on the order of 40 to 50 pounds per cubic foot. If the mixture is made of sixteen parts filler per part polymer the density will be on the order of 38 to 45 pounds per cubic foot, and if thirty two parts extending filler are combined with one part silicone polymer the density will range from about 36 pounds to about 42 pounds per cubic foot. Free-flowing, polymer densified ground quartz extending fillers within the scope of the present invention and the recommended mixing times are set forth in Table II.

TABLE II

| Filler/Polymer Ratio | Mixing Time (min.) | Density (lb/ft³) |
|---|---|---|
| 8:1 | 20 | 49 |
| 16:1 | 20 | 42 |
| 32:1 | 20 | 40 |
| 50:1 | 20 | 38 |
| Pure Minusil ® | — | 36 |

Experience to date has been that the preferred extending filler to silicone polymer ratio should be from 9:1 to 35:1 and most preferably from 10:1 to 20:1.

In practicing the present invention the silicone polymer and an effective amount of reinforcing filler, extending filler, or mixture thereof are added to a suitable mixing vessel or mixing device, such as a Henschel mixer, for example. An agitating means, which normally is a blade or plurality of blades, is caused to mix or blend the polymer and filler so as to form free-flowing, substantially spherical particles having a diameter of from about 1 to about 100 microns. More preferably the particle diameter will range from 10 to 75 microns and most preferably from 20 to 50.

It is also within the scope of the present invention to first place the polymer in the mixing vessel or device and during mixing either continuously or in batches add filler to the mixing vessel.

The blades of suitable mixing devices typically have a radius ranging from 1 to 108 inches or more. The only critical requirement is that the mixing means have the proper combination of blade size and blade speed. Generally this will vary from 40 rotations per minute for a 108 inch blade to about 25,000 rotations per minute for a 1 inch blade. As can easily be appreciated, the larger the blade radius the lower the blade speed that can be tolerated; i.e., it is the blade tip speed which is critical. The reader interested in obtaining more detailed information relating to the agitator or mixing means is referred to Link and Scarbel, U.S. Pat. No. 3,824,208. However, those skilled in the art will be able to determine suitable mixing conditions without undue experimentation.

The time necessary to provide adequate blending of polymer and filler can range anywhere from about 10 minutes to 90 minutes, but more preferably ranges from 15 minutes to 30 minutes. As discussed hereinabove, while the mixing time is important to the process of the present invention, it will vary depending upon the type of filler and the type of polymer employed as well as the filler to polymer ratio utilized. Table III illustrates typical mixing times for various ratios of reinforcing and extending fillers to silicone polymer, the length of time required to initially obtain free-flowing polymer-densified filler, and the time required to obtain optimally compacted filler.

TABLE III

| Filler/Polymer Ratio | Min. Until Uniform Free-Flowing | Min. Until Optimal Density | Δ% Density |
|---|---|---|---|
| 1:1 | 5 | 30 | 650% |
| 2:1 | 5 | 30 | 200% |
| 3:1 | 5 | 30 | 150% |
| 4:1 | 5 | 30 | 100% |
| 5:1 | 5 | 30 | 80% |
| 8:1 | 5 | 20 | 36% |
| 16:1 | 5 | 20 | 17% |
| 32:1 | 5 | 20 | 11% |

Note: The filler wherein the ratio is from 1:1 to 4:1 is a fumed silica filler, and the filler wherein the ratio is from 8:1 to 32:1 is a ground quartz filler.

Of course, in practicing the process of the present invention the length of time for which the polymer and filler are blended can be greater or less than required to obtain optimal properties. By optimal properties is meant that the density will not significantly increase for the additional time required to obtain such increase. Similarly in certain instances it may not be necessary or desirable to compact or densify the filler to the greatest extent possible. Accordingly, Table III can be appreciated as merely illustrating the surprising discovery that continued mixing of a silicone polymer and reinforcing or extending filler provides a means for making fillers more dense, thus lowering associated transportation and storage costs. Moreover, an additional advantage provided by the process of the present invention is that the time required to mix the polymer densified filler with a silicone composition is substantially reduced, thus enabling the formulator or compounder to increase his productivity.

Another important advantage, specifically with respect to fillers which can cause silicosis, e.g. $\alpha$-quartz IMinusil ®, is that polymer densified extending fillers are less "dusty" than the pure extending fillers and, therefore, help minimize the health risks when handling these materials.

The temperature at which the process of the present invention is carried out is generally between 0° C. and 100° C., preferably from 25° C. to 60° C., and more preferably is carried out at about 25° C. Furthermore, the process can be carried out either under vacuum, at atmospheric pressure or at elevated pressure.

The following examples are given by way of illustration and are not intended to be limiting. All parts are by weight unless otherwise noted.

EXAMPLES

Example 1

To a 0.2 cubic foot capacity Henschel mixer were added 550 grams of surface treated fumed silica (½ of the total fumed silica) and 1100 grams of a silicone polymer having a viscosity of 30,000,000 centipoise at 25° C. The mixing blades, having a radius of about 4 inches, are operated at a speed of about 3800 rotations per minute. After 5 minutes mixing the temperature is 52° C. and the mixture has a density of 16.6 pounds per cubic foot. After 5 additional minutes of mixing the density further increased to 26.2 pounds per cubic foot while the temperature remained about the same. After a total of 15 minutes the density of the mixture was found to have dropped slightly to 23.3 pounds per cubic foot. At this point an additional 335 grams (total=905 g) of treated silica filler was added to the mixture. The mixture was blended for an additional 5 minutes at which time the density was 25.8 pounds per cubic foot and the temperature had risen to about 70° C. The final 195 g required to make a 1:1 filler to polymer ratio was added and mixing resumed for an additional five minutes. At this time (25 minutes total mixing) the density of the polymer-compacted filler reached its maximum of 30.8 pounds per cubic foot. The temperature remained at about 70° C. An additional five minutes mixing resulted in a polymer-densified filler having a density of 30.0 pounds per cubic foot. This example illustrates the substantial increase in filler density obtained by practicing the present invention. Also, this example shows the effectiveness of adding incremental portions rather than adding all of the filler to the polymer at the start.

Example 2

This example is similar to Example 1 except that the fumed silica and silicone polymer, mixed in a 1:1 ratio, are all added to the Henschel mixer from the start. 550 grams of the same silicone polymer was mixed with 550 grams of treated fumed silica and after 5 minutes mixing the density was 5.0 pounds per cubic foot and the temperature was 33° C. Five additional minutes mixing resulted in a 50% increase in density to 7.5 pounds per cubic foot, and still another five minutes mixing effected nearly a 100% increase to 14.6 pounds per cubic foot. At 20 minutes the temperature had increased to about 40° C. and the density of the compacted filler had reached 19.0 pounds per cubic foot. Two additional 5 minute periods of mixing did not substantially increase the density; i.e., after 25 minutes mixing the density was 20.0 pounds per cubic foot and after half an hour of mixing the density was 21.5 pounds per cubic foot. This shows that the present invention provides a densification of about 537% (21.5/4.0×100), but is not as effective as adding filler to the polymer incrementally.

Example 3

This example serves to illustrate the criticality of blade tip speed in practicing the present invention. To two 0.2 cubic foot capacity Henschel mixers were added 550 grams of fumed silica and 275 grams of silicone polymer. The ingredients were mixed for one half hour with samples taken at 5 minute intervals to determine density and temperature. The difference, however, was that the first mixer was operated at 1800 rotations per minute whereas the second mixer was operated at rotations per minute. The results are set forth in Tables IV and V.

TABLE IV

| Mix Time (min) | (1800 rpm) | |
|---|---|---|
| | Temp °C. | Density (lb/ft³) |
| 5 | 56 | — |
| 10 | 52 | 4.8 |
| 15 | 48 | 4.3 |
| 20 | 45 | 4.8 |
| 25 | 45 | 4.9 |
| 30 | 45 | 5.1 |

TABLE V

| Mix Time (min) | (3800 rpm) | |
|---|---|---|
| | Temp °C. | Density (lb/ft³) |
| 5 | 46 | — |
| 10 | 62 | 5.2 |
| 15 | 93 | 7.3 |
| 20 | 106 | 8.7 |
| 25 | 110 | 9.2 |
| 30 | 105 | 10.0 |

As can be seen from Tables IV and V, densification is not effected when the mixing of the polymer and filler is not effected at or near the critical blade tip speed.

Example 4

The mixtures of Example 3 were not cooled so as to lower the process temperature. Accordingly the present example illustrates that somewhat improved densities are obtained by operating the process at lower temperatures. The experimental conditions are the same as in Example 3, with the following results.

TABLE VI

| Mix Time (min) | Temp °C. | Density (lb/ft³) |
|---|---|---|
| 5 | 32 | — |
| 10 | 43 | 5.0 |
| 15 | 64 | 6.7 |
| 20 | 68 | 9.6 |
| 25 | 70 | 10.4 |
| 30 | 56 | 11.6 |

Example 5

This example shows that fillers densified in accordance with the present invention are easily and quickly mixed into other silicone polymers. To a Henschel mixer was added 80 parts of 5 micron Minusil ® (ground quartz) and 10 parts of silicone gum having a penetration of 850 (viscosity 23,500,000 cps). A second mix was made with 80 parts of Minusil ® and 5 parts of the same polymer. The following formulations and mix items were produced.

TABLE VII

|  | A | B | C |
|---|---|---|---|
| Grams of silicone polymer | 250 | 250 | 250 |
| Grams polymer as above | 30 | 15 | — |
| 5 micron Minusil ® powder | 250 | — | — |
| 16:1 Minusil ® and polymer powder | — | 265 | — |
| 8:1 Minusil ® and polymer powder | — | — | 280 |
| Time in seconds to mix in powder | 120 | 30 | 20 |
| Grams of filler on pan after first filler addition | 100 | 1 | 1 |

As shown in Table VII, densified extending fillers prepared in accordance with the present invention can be incorporated into a base polymer substantially more rapidly than undensified Minusil ®. Moreover, the quantity of filler not incorporated into the base polymer on the first addition is negligible as compared to the quantity of Minusil ® in experiment A which falls on the pan. As can be appreciated from the data in Table VII, the time required to mix a polymer-densified extending filler into a base silicone polymer is reduced by a factor of 4 to 6.

I claim:
1. A method for providing polymer-densified fillers, consisting essentially of:
  (A) adding to a suitable mixing vessel;
    (i) 100 parts by weight of a silicone polymer or mixture of silicone polymers having a viscosity ranging from about 1000 to about 200,000,000 centipoise at 25° C.; and
    (ii) an amount of filler comprising:
      (a) 50 to 500 parts by weight of reinforcing filler per 100 parts by weight of said silicone polymer; and
      (b) 900 to 5000 parts by weight of extending filler per 100 parts by weight of said silicone polymer; and
  (B) mixing said silicone polymer and said filler for an amount of time effective for providing a free-flowing particulate mixture having a density at least 100 percent higher than when the silicone polymer and filler first became free-flowing particles.

2. The method of claim 1 wherein the silicone polymer has the general formula:

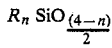

where R is a monovalent hydrocarbon radical, a halogenated monovalent hydrocarbon radical or a cyanoalkyl radical and n varies from 1.95 to 2.1 inclusive.

3. The method of claim 1 wherein the viscosity of the silicone polymer varies from 100,000 to 50,000,000 centipoise at 25° C.

4. The method of claim 1 wherein the viscosity of the silicone polymer varies from 1,000,000 to 40,000,000 centipoise at 25° C.

5. The method of claim 1 wherein the reinforcing filler is selected from the group consisting of fumed silica, precipitated silica and silica aerogel.

6. The method of claim 5 wherein the fumed silica, precipitated silica and silica aerogel are treated.

7. The method of claim 1 wherein there is added from about 100 to about 250 parts of reinforcing filler per 100 parts silicone polymer.

8. The method of claim 1 wherein there is added about 100 parts of reinforcing filler per 100 parts of silicone polymer.

9. The method of claim 1 wherein the reinforcing filler has a surface area of at least about 50 square meters per gram.

10. The method of claim 1 wherein the reinforcing filler has a surface area of at least about 100 square meters per gram.

11. The method of claim 1 wherein the mixing time is at least 50 percent more than required to initially form a free-flowing mixture.

12. The method of claim 1 wherein the mixing time is at least 100 percent more than required to initially form a free-flowing mixture.

13. The method of claim 1 wherein the diameter of the free-flowing, polymer-densified filler particles ranges from about 1 to about 100 microns.

14. The method of claim 1 wherein the diameter of the free-flowing, polymer-densified filler particles ranges from about 10 to about 75 microns.

15. The method of claim 1 wherein the diameter of the free-flowing, polymer-densified filler particles ranges from about 20 to about 50 microns.

16. The method of claim 1 wherein the extending filler is selected from the group consisting of titanium oxide, lithopone, zinc oxide, zirconium silicate, iron oxide, diatomaceous earth, calcium carbonate, glass fibers, magnesium oxide, chromic oxide, aluminum oxide, crushed quartz, calcined clay, asbestos, carbon graphite and cork.

17. The method of claim 1 wherein the extending filler is selected from the group consisting of diatomaceous earth, calcium carbonate and crushed quartz.

18. The method of claim 1 wherein the extending filler is crushed quartz.

19. The method of claim 1 wherein there is added from about 900 parts to about 3500 parts of extending filler per 100 parts silicone polymer.

20. The method of claim 1 wherein there is added from about 1000 parts to about 2000 parts of extending filler per 100 parts silicone polymer.

21. The method of claim 1 wherein the polymer is first added to the mixing vessel and the filler is added to said polymer during mixing.

22. The method of claim 21 wherein the filler is added in batches.

23. The method of claim 21 wherein the filler is added continuously.

24. A method for adding filler to a base silicone composition comprising:
  (A) adding to a suitable mixing vessel:
    (i) 100 parts by weight of a silicone polymer or mixture of silicone polymers having a viscosity ranging from about 1000 to about 200,000,000 centipoise at 25° C.; and
    (ii) an amount of filler comprising:
      (a) 50 to 500 parts by weight of reinforcing filler per 100 parts by weight of said silicone polymer; and
      (b) 900 to 5000 parts by weight of extending filler per 100 parts by weight of said silicone polymer; and
  (B) mixing said silicone polymer and said filler for an amount of time effective for providing a free-flowing particulate mixture having a density at least 100 percent higher than when the silicone polymer and filler first became free-flowing particles;

(C) adding an effective amount of said free-flowing, polymer-densified filler to said base silicone composition; and (D) combining said polymer-densified filler and said base silicone composition by a suitable means.

25. The method of claim 24 wherein the means for combining the polymer-densified filler and the base silicone composition is a mill-band.

* * * * *